United States Patent [19]
Cho

[11] Patent Number: 4,830,042
[45] Date of Patent: May 16, 1989

[54] LIQUID LEVEL CONTROL FLOAT VALVE
[76] Inventor: Jin S. Cho, 181-28 Gamman 1-Dong,, Nam-Ku, Pusan, Rep. of Korea
[21] Appl. No.: 257,271
[22] Filed: Oct. 13, 1988
[30] Foreign Application Priority Data
Aug. 19, 1988 [KR] Rep. of Korea .............. 88-13629
[51] Int. Cl.$^4$ ............... F16K 43/00; F16K 31/34
[52] U.S. Cl. ............... 137/315; 137/413; 137/426; 137/429; 137/434; 251/28; 251/44
[58] Field of Search ............... 137/315, 413, 414, 426, 137/429, 434, 446, 447; 251/28, 43, 44, 45, 46

[56] References Cited
U.S. PATENT DOCUMENTS

| | | | |
|---|---|---|---|
| 751,096 | 2/1904 | Nethery | 251/44 |
| 993,628 | 5/1911 | Williams | 137/413 |
| 1,302,538 | 5/1919 | Gulick | 137/413 |
| 1,525,247 | 2/1925 | Leiss | 137/426 |
| 1,555,755 | 9/1925 | Pratt | 251/44 |
| 1,676,084 | 7/1928 | Flagg | 137/414 |
| 1,694,072 | 12/1928 | Manion | 137/413 |
| 1,826,088 | 10/1931 | Ostlind | 251/44 |
| 2,092,670 | 9/1937 | Hess et al. | 137/413 |
| 2,825,526 | 3/1958 | Zuiderhoek | 251/44 |
| 3,907,248 | 9/1975 | Coulbeck | 251/44 |

FOREIGN PATENT DOCUMENTS
4313906 11/1964 Japan .............. 251/44

Primary Examiner—George L. Walton
Attorney, Agent, or Firm—Birch, Stewart, Kolasch & Birch

[57] ABSTRACT

A liquid level control float valve comprising a valve body having an inlet, a cap having an outlet, a drain pipe having a drain aperture, a piston member having a fluid aperture disposed in an upper plate and a disc valve disposed in the lower portion thereof, and a float ball connected to the outlet through an open/close valve, whereby upon the change in the level of the liquid, the float ball is raised and or lowered which in turn moves the piston member which further opens or closes in a corresponding manner the outlet and the drain aperture.

14 Claims, 10 Drawing Sheets

FIG 1(A)
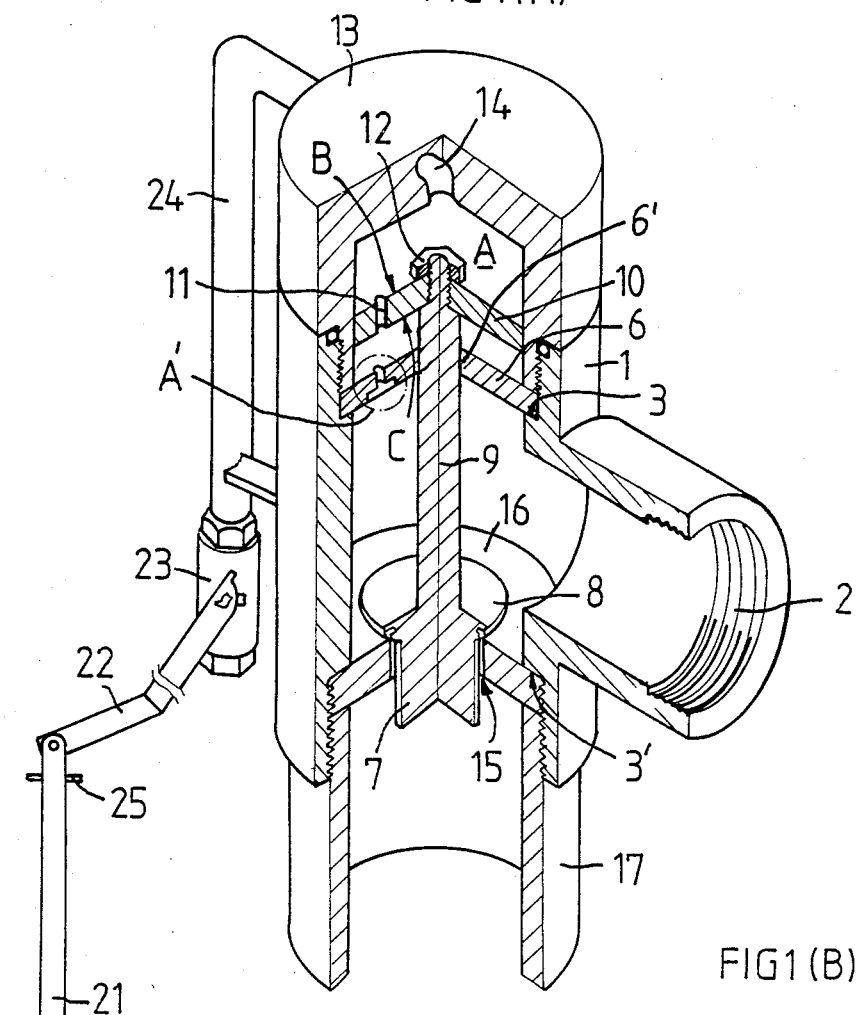
FIG 2
FIG 1(B)
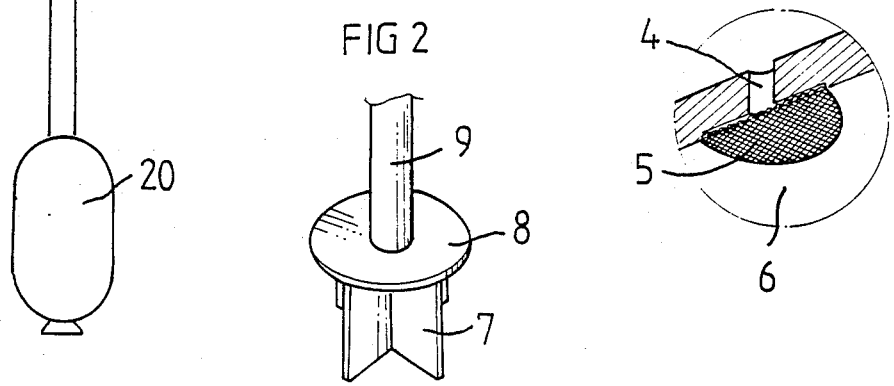

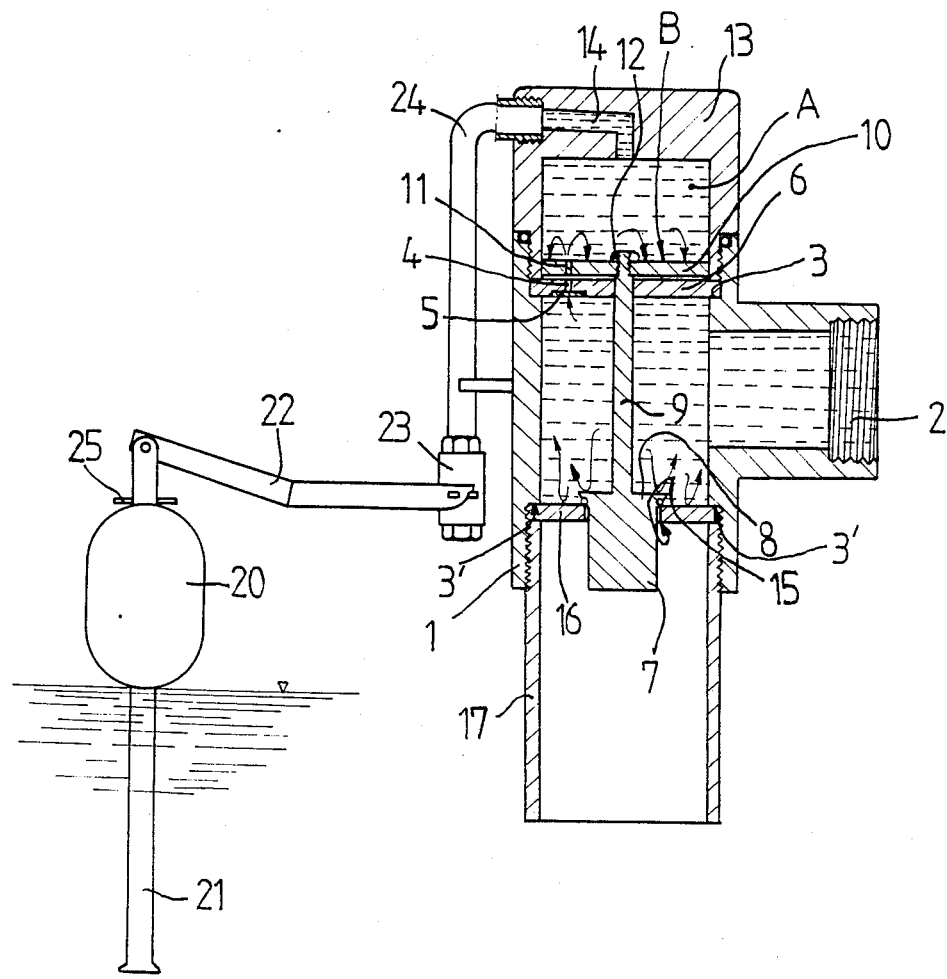

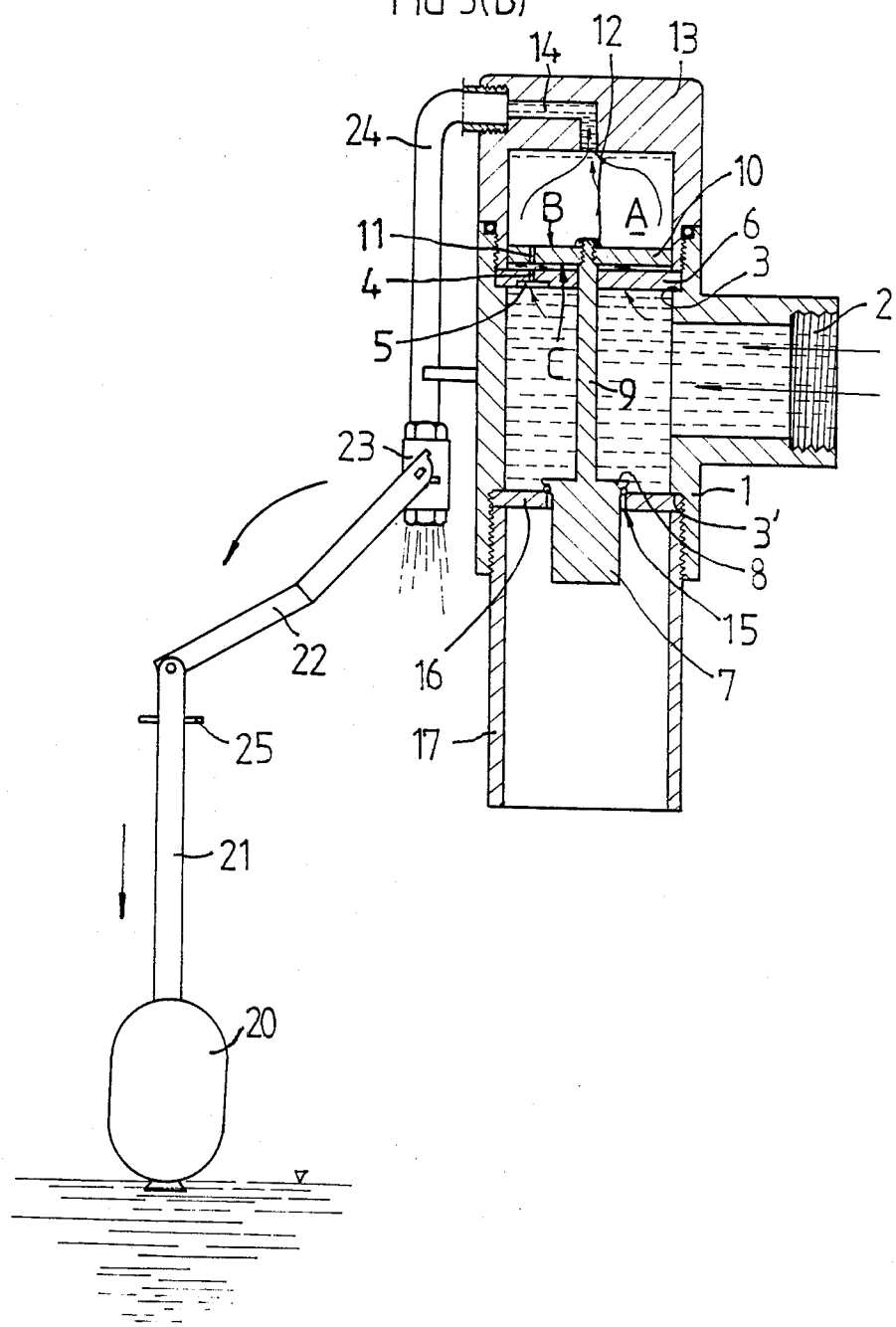

LIQUID LEVEL CONTROL FLOAT VALVE

BACKGROUND OF THE INVENTION

1. Field of the Invention

The present invention relates to a liquid level control float valve and more particularly, to an improved liquid level control float valve including an open/close valve connected to a float ball and a valve body which contains a piston member having a disc valve for opening and closing an outlet or a drain aperture of the valve body, respectively, whereby the liquid used in controlling the liquid level in the valve of the present invention originates from a low reservoir tank or a high reservoir tank installed in buildings, apartments, factory buildings, and the like.

2. Description of the Prior Art

There are many types of liquid control devices such as leveling valves, motorized valves or solenoid valves. However, these valves suffer from a number of disadvantages such as, for example, they require a power source from a reservoir tank attached thereto, and they cannot always prevent fluid flow since dregs collecting at the valves prevents the valves from tightly closing.

Furthermore, it is conventional practice in the prior art to use a float ball tap. The float ball tap is structured for closing the fluid flow by the buoyancy action of a float ball mounted to the end of a lever which is attached to a plurality of hinges. However, the float ball tap suffers from a number of disadvantages such as, for example: (1) it is difficult to prevent the fluid from leaking into the valve seat when the pressure of the fluid flow through the conduit is higher than that of the valve closed by the buoyancy action of the float ball; (2) the valve might be opened and a large volume of the fluid lost since a lever can be destroyed at the bending portion or connecting portion thereof with the float ball causing an increased buoyancy force; (3) the float ball tap must be frequently replaced; (4) since the valve of the float ball tap is continuously actuated by the buoyancy action, the tensibility of the lever is gradually replaced; and (5) it is difficult for the float ball tap to control the fluid level when the ball tap is attached to reservoir tanks at locations with different heights, for example, at the top of buildings with different heights.

According to the U.S. Pat. No. 4,741,358 entitled "liquid level control float valve" issued the inventor of the present invention, the liquid level control float valve disclosed includes an open/close valve disposed in a valve body which is substantially operated by the rising or lowering of a float ball. However, if a drain aperture of the valve body has a large diameter, a lever connected to the float ball has to be extended or the float ball has to be enlarged. Therefore, the reservoir tank has to be enlarged.

SUMMARY OF THE INVENTION

Accordingly, it is an object of the present invention to provide an improved liquid level control float valve.

Another object of the present invention is to provide a liquid level control float valve which is structured for completely opening or closing an open/close valve and the liquid flow associated therewith by the raising or lowering of a float ball.

A further object of the present invention is to provide a liquid level control float valve which is provided with an open/close valve connected to a float ball and a valve body including an outlet disposed in the top portion, an inlet disposed in the middle portion, and a drain aperture disposed in the bottom portion of the valve body, and a piston member for operatively opening and closing the outlet or the drain aperture whereby upon the change in the level of the liquid, the float ball is raised and lowered which in turn moves the piston member which further opens or closes in a corresponding manner the outlet and the drain aperture.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a liquid level control float valve comprising a valve body having an inlet, a cap having an outlet, a drain pipe having a drain aperture, a piston member having a fluid aperture disposed in an upper plate and a disc valve disposed in the lower portion thereof, and a float ball connected to the outlet through an open/close valve whereby upon the change in the level of the liquid, the float ball is raised or lowered which in turn moves the piston member which further opens or closes in a corresponding manner the outlet and the drain aperture.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1(A) is an enlarged perspective view of a liquid level control float valve of the present invention showing in cut away portions thereof a T-shaped piston operatively associated with an outlet and a drain aperture;

FIG. 1(B) shows an inlet hole and screw provided in a valve plate of the piston;

FIG. 2 is a perspective view of a disc member of the liquid level control float valve of the present invention;

FIG. 3(A) diagrammatically shows the actuating system of the present invention wherein a lever moves to a horizontal position when the liquid is completely filled in the reservoir tank;

FIG. 3(B) diagrammatically shows the actuating system of the present invention wherein the lever is lowered as the fluid is drained and before the valve is in an opened position;

DETAILED DESCRIPTION OF THE INVENTION

Figure 3C:
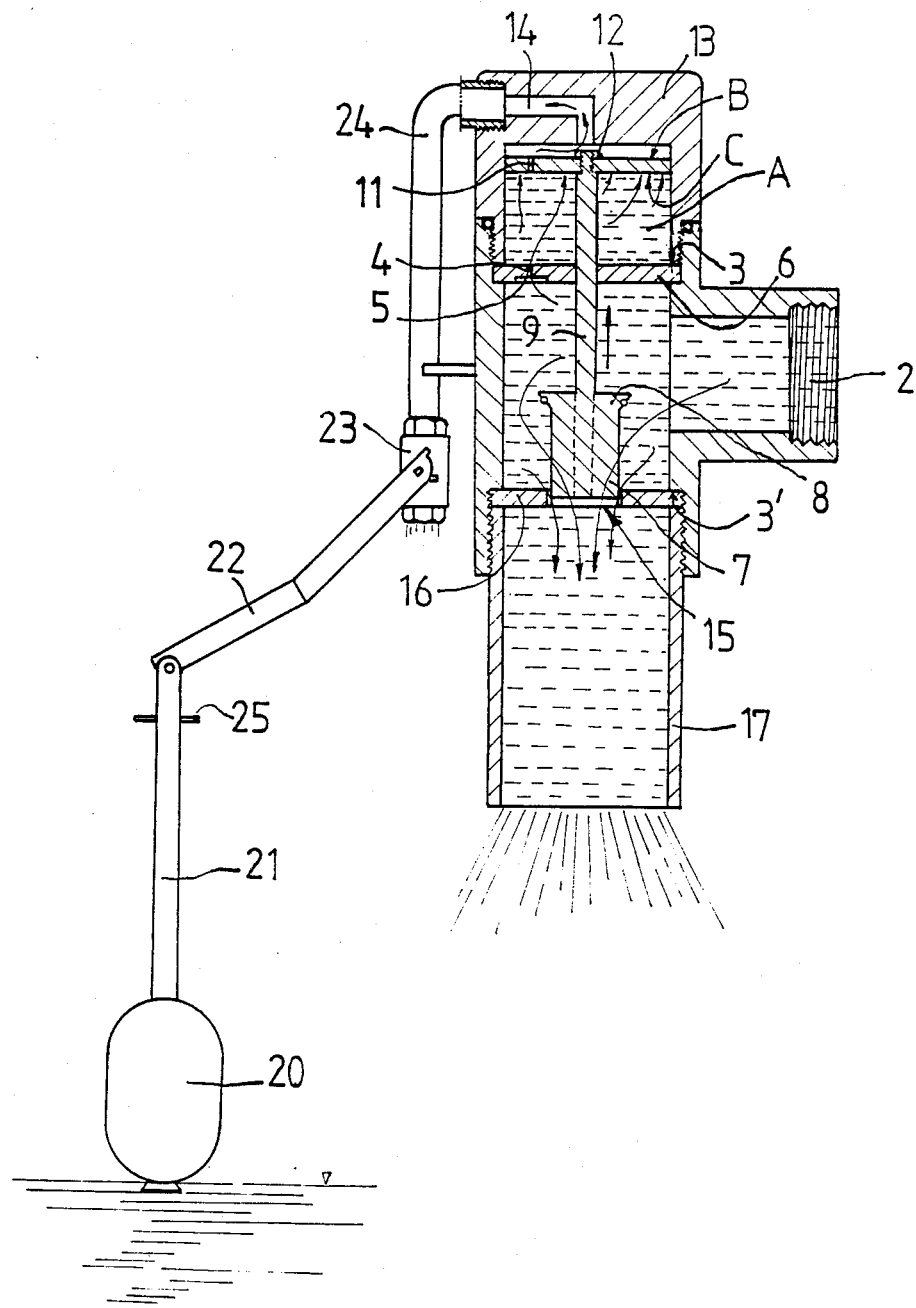
FIG. 3(C) diagrammatically shows the actuating system of the present invention wherein the lever is completely lowered due to the fluid being completely drained from the system and the valve is now placed in an open position.

Referring now in detail to the drawings for the purpose of illustrating the present invention, the liquid level control float valve of the present invention as shown FIG. 1 comprises a valve body 1 including an inlet 2 disposed in a side wall, a cap 13 connected to the top end, and a drain pipe 17 connected to the bottom end thereof wherein the valve body 1 connects to the cap 13 and the drain pipe 17 through respective screwed portions 1'. The valve body 1 is provided with annular raised portions 3 and 3' disposed at top and bottom ends thereof for receiving a plate 6 having a central removable plate aperture 6', and a valve seat 16 having a valve seat aperture 15 disposed in a center portion thereof. The removable plate 6 includes an inlet hole 4 with a screen 5 for filtering solid products in the liquid (FIG. 1(B)). By unscrewing the cap 13, the plate can be removed for cleaning the screw 5. The valve body 1 includes a piston body 9 which extends through the inside of the valve body 1 and the plate aperture 6, to a liquid chamber A disposed in the inside of the cap 13. The piston body 9 is connected to a piston plate 10, at the top end thereof by a bolt 12 for smoothly moving up and down along the inside wall of the cap 13. The piston plate 10 includes a fluid flow aperture 11 disposed therein. Also, the piston body 9 is connected to a disc valve 8 disposed, at the lower portion thereof and extended to a plurality of guide plates 7 disposed at the bottom end thereof for opening or closing the valve seat aperture 15 (FIG. 2). At this time, a piston member composed of the piston body 9 and the piston plate 10 has a T-shaped configuration. The outlet 14 of the cap 13 is connected to an open/close valve 23 through a connecting pipe 24. The open/close valve 23 is operatively connected to a ball tap lever 22 which pivotably connects to a vertical rod 21. A float ball 20 moves along the vertical rod 21 up to a height adjusting pin 25.

Figure 4:
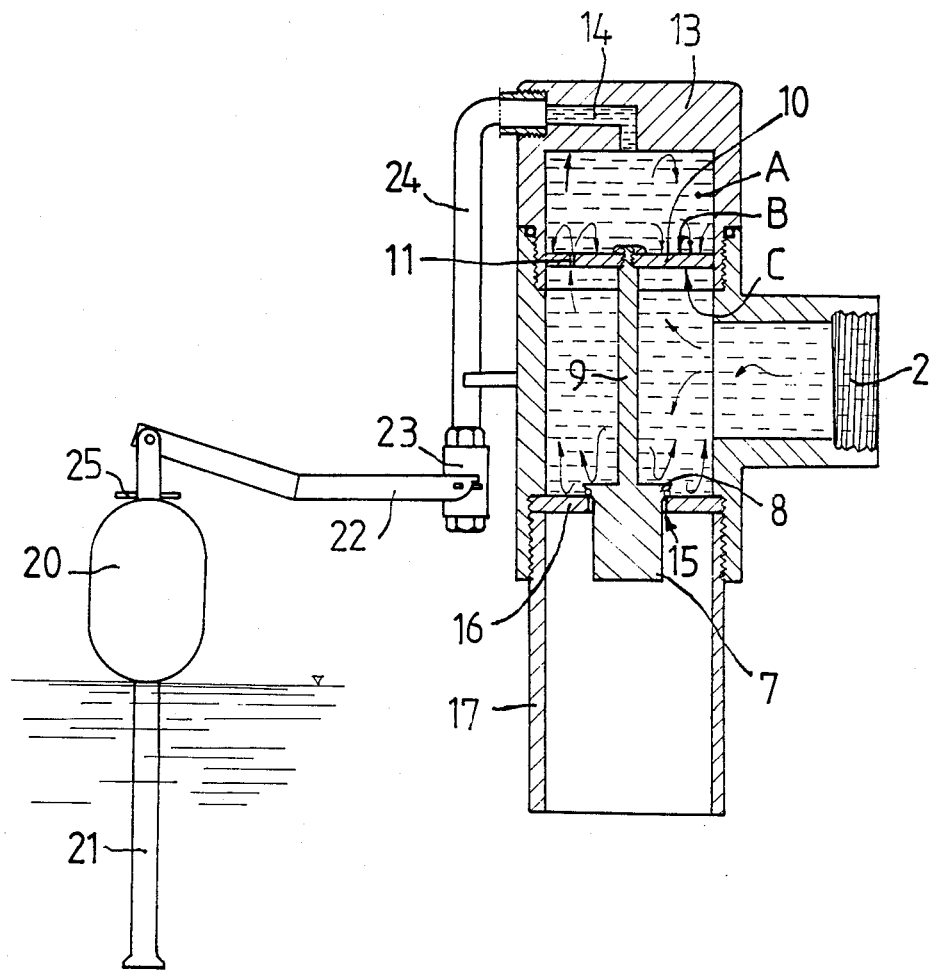
FIG. 4 diagrammatically shows a single plate piston of the present invention with the valve in a closed position.

Referring in detail to FIG. 4, there is illustrated another embodiment of removing the plate 6 disposed at the top end of the valve body 1 of FIG. 1 of the present invention when the liquid level control float valve is of a small or medium small size since a small or medium small valve is usually operated with a weaker water pressure therein.

Figure 5:
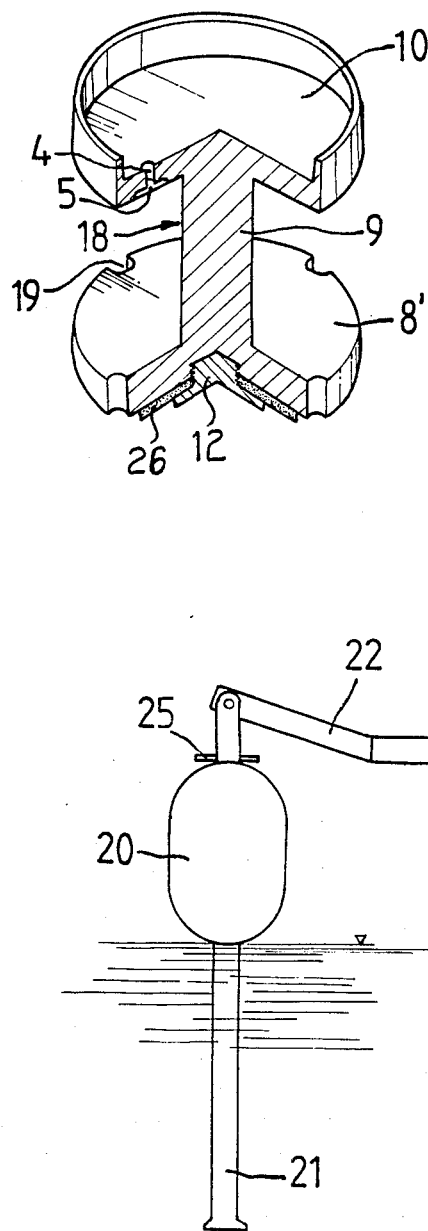
FIG. 5 is an enlarged perspective view of the single plate piston of the preset invention showing in cut away portions thereof the plate.

Referring in detail to FIGS. 5, 6(A), 6(B), 6(C), and 6(D), there is illustrated a further embodiment of a piston member of the present invention. As shown in FIG. 5, an H-shaped position member 18 includes the piston body 9, a upper plate 10' having the inlet hole 4 with the screen 5, and a lower plate 8' (disc valve) having a plurality of slots 19 for flowing the liquid. The lower plate 8' contains a rubber backing 26 for closely contacting with the valve seat aperture 15.

Figure 3D:
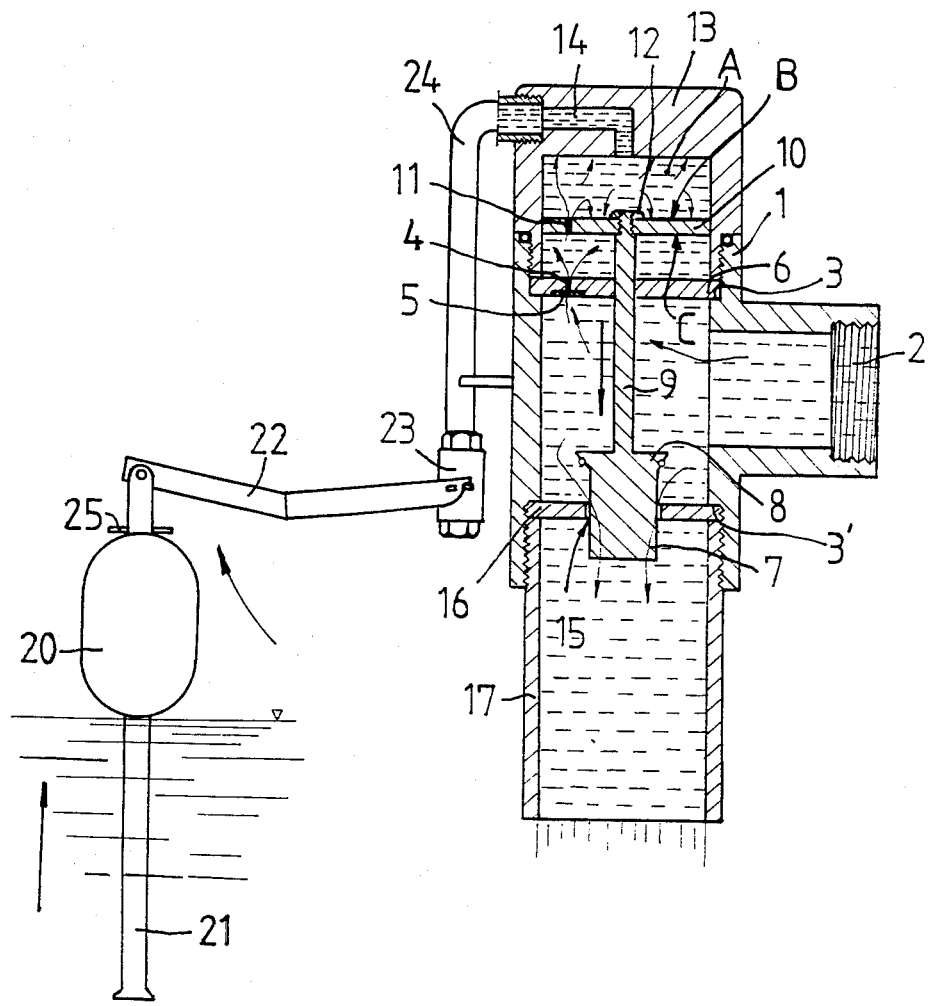
FIG. 3(D) diagrammatically shows the actuating system of the present invention wherein the lever begins to rise and the valve is in an open position as the liquid starts to fill the reservoir.

According to the present invention, the liquid level control float valve operates as follows: When the liquid such as water, gasoline, or the like is drained, the ball top lever 22 is lowered in the direction indicated by the arrow from FIG. 3(A) to FIG. 3(B). The ball tap lever 22 is simultaneously operated to open the open/close valve 23 due to the power of the float ball 20. Accordingly, the liquid filled in the liquid chamber A flows into a reservoir tank through the outlet 24 and the open/close valve 23 (FIG. 3(B)). At this time, the disc valve 8 is still closed. Thereafter, when the float ball 20 drops to the bottom of the reservoir (FIG. 3(C)), the liquid and the liquid pressure in the liquid chamber A are almost discharged and eliminated from the liquid chamber A. Accordingly, the liquid pressure cannot operate on the surface B of the piston plate 10. Therefore, the liquid filled in the inside of the valve body 1 is permitted to flow into the inlet hole 4 through the screen 5. At this time, the power of the water pressure pushes the piston plate 10 on a surface C thereof (FIG. 3(B)). Accordingly, the T-shaped piston member moves up to ceiling of the liquid chamber A and correspondingly, the disc valve 8 moves up to permit the liquid to flow through the valve seat aperture 15 of the valve seat 16 (FIG. 3(C)). Also, a small amount of the liquid still flows into the reservoir through the screen 5, the inlet hole 4, the fluid flow aperture the outlet 14, and the open/close valve 23. The liquid discharged from the open/close valve 23 and the valve seat aperture 15 fills into the reservoir tank so that the level of the liquid rises as shown in FIG. 3(D). When the level of the liquid has risen to vertically move the float ball 20 along the vertical rod 21 up to the height adjusting pin 25, the open/close valve 23 effectively closes due to the power of buoyancy of the float ball 20. Thereafter, the liquid filled in the liquid chamber A pushes the surface B of the piston plate 10 and the T-shaped piston member moves down in the direction indicated by arrow shown in FIG. 3(D). Therefore, the disc valve 8 effectively closes the valve seat aperture 15, from the disc valve opened-position shown in FIG. 3(D) to the disc valve closed position shown in FIG. 3(A).

Referring in detail to FIG. 4, there is illustrated the operation of another embodiment of the liquid level control float valve of the present invention. When the power of the liquid pressure is very small, while the liquid level control float valve is of a small or medium small size, the power of the liquid filled in the inside of the valve body 1 can push the surface C of the piston plate 10 and the other steps of the operation of the valve device are repeated as noted above with regard to the valve device according to the present invention.

Figure 6A:
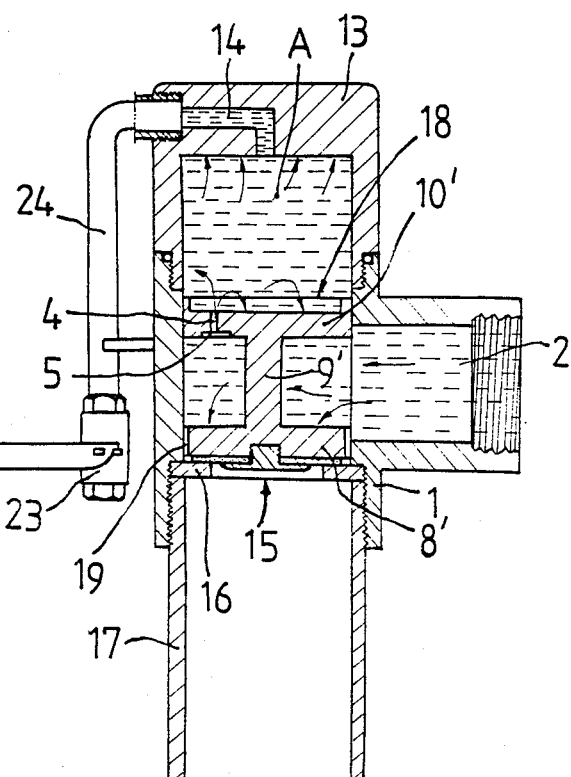
FIG. 6(A) diagrammatically shows the actuating system of the another embodiment of the present invention wherein a lever moves to a horizontal position when tee liquid is completely filled in the reservoir tank.
Figure 6B:
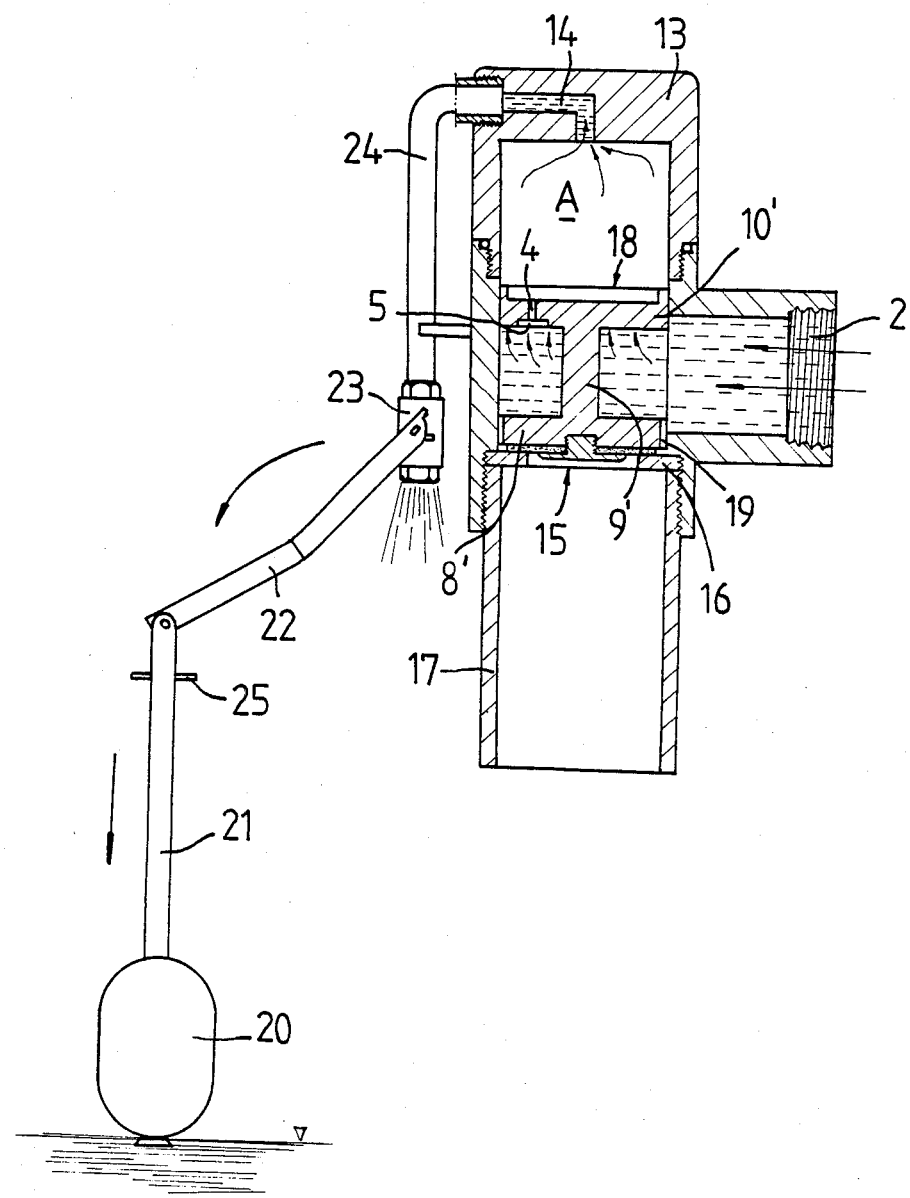
FIG. 6(B) diagrammatically shows the actuating system of the another embodiment of the present invention wherein the lever is lowered as the fluid is drained and before the valve is in an opened position.
Figure 6:
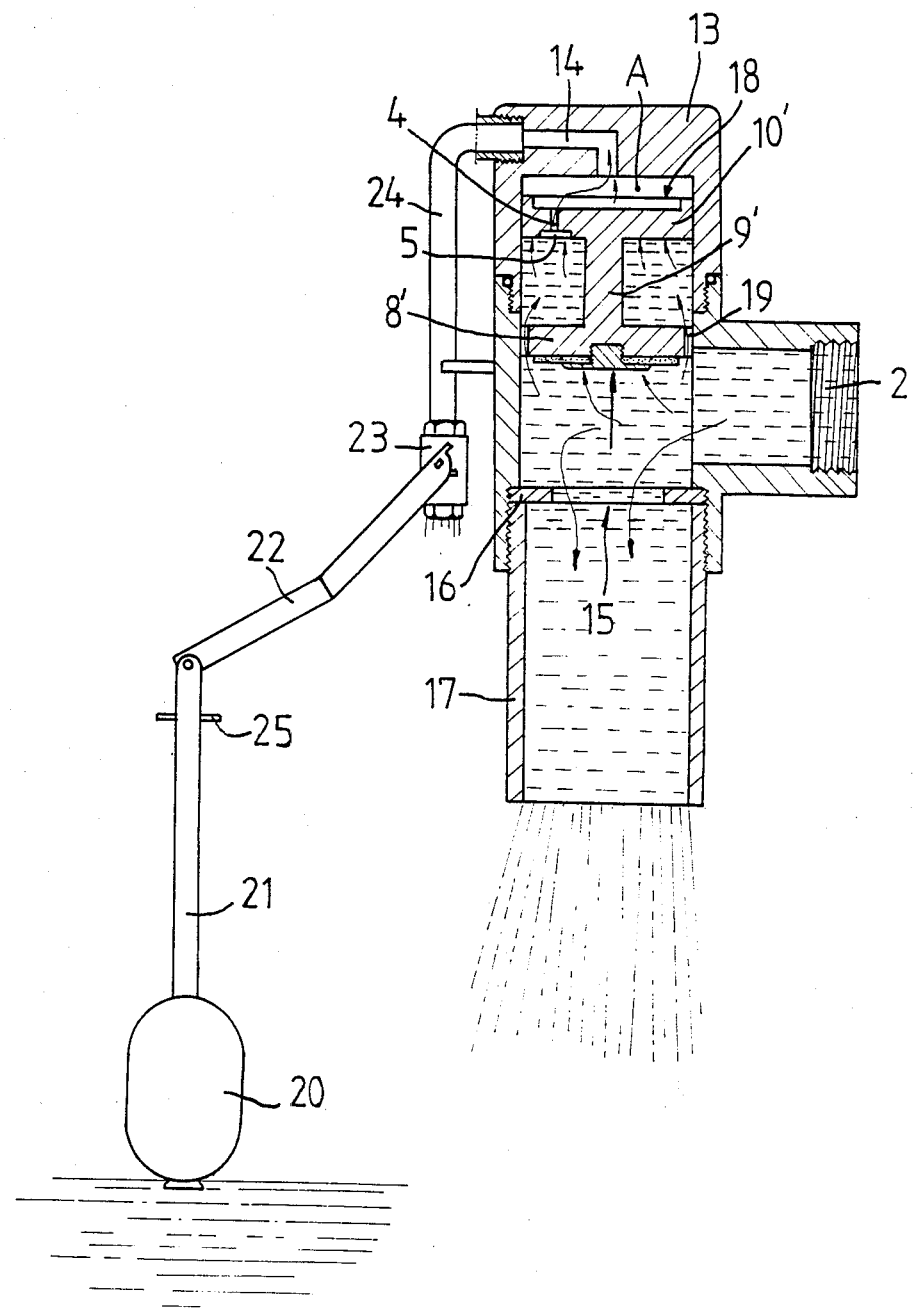
FIG. 6(C) diagrammatically shows the actuating system of the another embodiment of the present invention wherein the lever is completely lowered due to the fluid being completely drained from the system and the valve is now placed in an open position.
FIG. 6(D) diagrammatically shows the actuating system of the another embodiment of the present invention wherein the lever begins to rise and the valve is in an open position as the liquid starts to fill the reservoir.
Figure 6D:
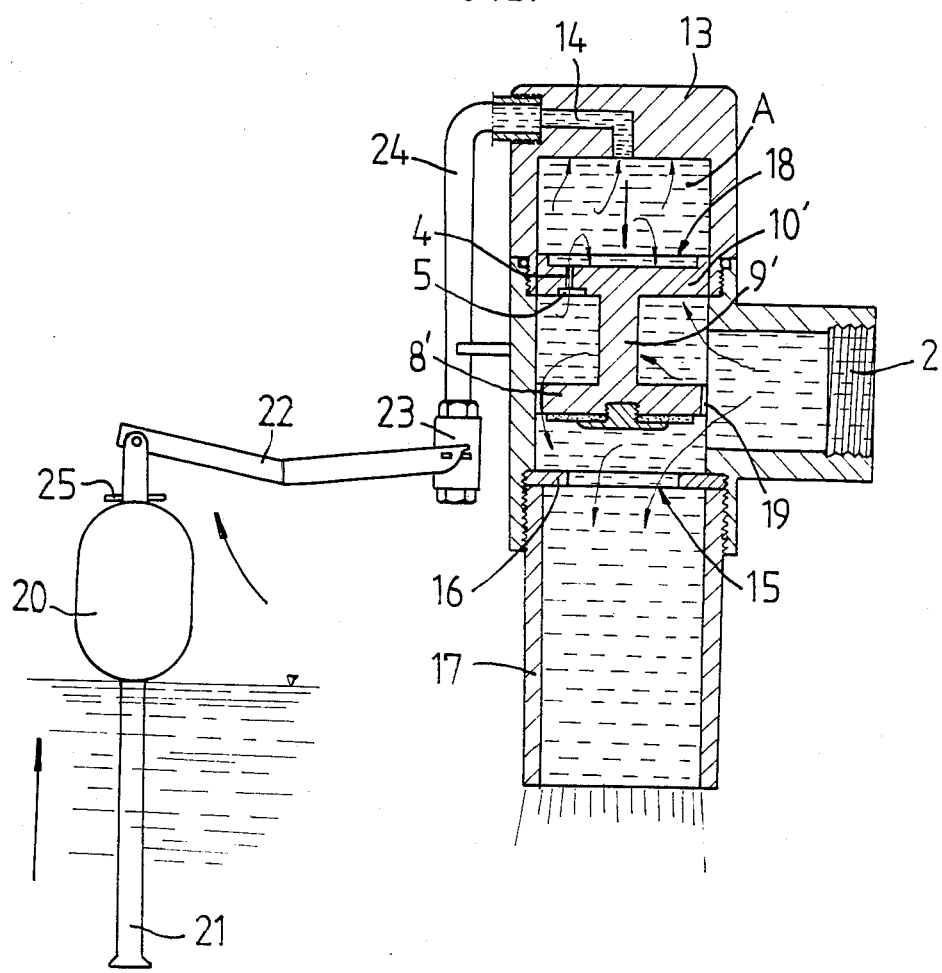

Referring in detail to FIGS. 6(A), 6(B), 6(C), and 6(D), there is illustrated the operation and function of a further embodiment of the liquid level control float vale according to the present invention. When the liquid is drained, the ball tap lever 22 is lowered in the direction indicated by the arrow from FIG. 6(A) to FIG. 6(B). The ball tap lever 22 is simultaneously operated to open the open/close valve 23 due to the power of the float ball 20. Accordingly, the liquid filled in tee liquid chamber A discharges into the reservoir tank through the outlet 14. At this time, the lower plate 8, still closes the valve seat aperture 15 and the liquid power in the liquid chamber A is very weak so that the liquid from the inlet 2 pushes the upper plate 10' of the H-shaped piston member 18. Accordingly, the H-shaped piston member 18 moves up to the ceiling of liquid chamber A and correspondingly, the lower plate 8' is separated from the valve seat aperture 15 to permit the liquid to flow into the reservoir tank as shown in FIG. 6(C). Thereafter, the steps of the operation of this embodiment according to the present invention are repeated as noted above with regard to the first embodiment of the valve device according to the present invention. That is, the open/close valve 23 opened-position as shown in FIG. 6(C) changes to the open/close valve 23 closed-position as shown in FIG. 6(D). Thereafter, the lower plate 8' the opened-position as shown in FIG. 6(D) changes to the lower plate closed-position as shown in FIG. 6(A).

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A liquid level control float valve which comprises:
    a hollow valve body including an inlet disposed in a side wall, a removable plate having an inlet hole disposed at the top end portion, said inlet hole having a filtering means associated therewith, whereby said filtering means can be cleaned by removing only the cap and the removable plate, and a valve seat having a drain hole disposed at the bottom end portion thereof,
    a cap having an outlet disposed at the top portion thereof and connected to said hollow valve body, said cap engaging said removable plate for maintaining said removable plate in a fixed position at the top end portion of said hollow valve body,
    a drain pipe connected to said hollow valve body, at the bottom end thereof,
    piston mean disposed in said hollow valve body, said cap, and said drain pipe, said piston means including a piston plate with a fluid flow aperture at the top portion thereof and a disc valve at the lower portion thereof for mating with said drain pipe,
    a float ball provided to determine the liquid level, and
    a float ball tap lever connected at one end to said float ball and at the other end to an open/close valve connected to said outlet of the cap for operatively opening or closing the open/close valve by operation of the float ball tap lever, whereby upon the change in the level of the liquid, the float ball is raised or lowered which in turn moves the piston means which further opens or closes in a corresponding manner the outlet and the drain pipe.

2. The liquid level control float valve of claim 1, wherein the valve body is connected to the cap and the drain pipe through screwed portions thereof, respectively.

3. The liquid level control float valve of claim 1, wherein inlet hole of the plate of the valve body is mated with the fluid flow aperture of the piston plate.

4. The liquid level control float valve of claim 1, wherein the disc valve includes a plurality of guide plates.

5. The liquid level control float valve of claim 1, wherein the piston means has a T-shaped configuration.

6. The liquid level control float valve of claim 1, wherein the float ball top lever is pivotably connected to a vertical rod and the float ball is slidably disposed on said vertical rod for movement along said vertical rod with a change in the liquid level and wherein a height adjusting pin is provided on said vertical rod for limiting the vertical movement of the float ball thereon.

7. The liquid level control float valve of claim 1, wherein the open/close valve is disc-shaped.

8. The liquid level control float valve of claim 1, wherein the liquid used is water.

9. The liquid level control float valve of claim 8, wherein the liquid used is gasoline.

10. A liquid level control float valve which comprises:
    a hollow valve body including an inlet disposed in a side wall and a valve seat having a drain hole disposed at the bottom end portion thereof,
    a cap having an outlet disposed at the top portion thereof and connected to said hollow valve body, at the top portion thereof and connected to said hollow valve body, at the top end thereof,
    a drain pipe connected to said hollow valve body, at the bottom end thereof,
    piston means disposed in said hollow valve body, said cap, and said drain pipe, said piston means including an upper plate with a fluid flow aperture, at the top portion thereof and a lower plate with a plurality of slots in the outer periphery thereof, at the bottom portion thereof for mating with said drain pipe, said upper and lower plate defining a fixed chamber therebetween regardless of the position of said piston, whereby when at least a portion of said slots in said bottom plate are moved above said valve body inlet, restricted flow is now able to flow therethrough to the underside of said upper plate for moving said lower plate away from said drain pipe to a full open position,
    a float ball provided to determine the liquid level, and
    a float ball tap lever connected at one end to said float ball and at the other end to an open/close valve connected to said outlet of the cap for operatively opening or closing the open/close valve by operation of the float ball tap lever, whereby upon the change in the level of the liquid, the float ball is raised or lowered which in turn moves the piston means which further opens or closes in a corresponding manner the outlet and the drain pipe.

11. The liquid level control float valve of claim 10 wherein the piston means has an H-shaped configuration.

12. The liquid level control float valve of claim 10, wherein the float ball top lever is pivotably connected to a vertical rod and the float ball is slidably disposed on said vertical rod for movement along said vertical rod with the change in the liquid level and wherein a height adjusting pin is provided on said vertical rod for limiting the vertical movement of the float ball thereon.

13. The liquid level control float valve of claim 10, wherein the open/close valve is disc-shaped.

14. The liquid level control float valve of claim 10, wherein the liquid used is water.

* * * * *